(12) United States Patent
    Jiang

(10) Patent No.: US 12,657,804 B2
(45) Date of Patent: Jun. 16, 2026

(54) METHODS FOR VIRTUAL IMAGE COMPENSATION

(71) Applicant: Hue Inc., Shanghai (CN)

(72) Inventor: Xingtong Jiang, Shanghai (CN)

(73) Assignee: Hue Inc., Shanghai (CN)

( * ) Notice: Subject to any disclaimer, the term of this patent is extended or adjusted under 35 U.S.C. 154(b) by 0 days.

(21) Appl. No.: 18/424,911

(22) Filed: Jan. 29, 2024

(65) Prior Publication Data

US 2024/0273801 A1     Aug. 15, 2024

(51) Int. Cl.
| | |
|---|---|
| *G06T 15/00* | (2011.01) |
| *G06T 7/90* | (2017.01) |
| *G06V 10/25* | (2022.01) |
| *G06V 10/56* | (2022.01) |
| *G06V 10/60* | (2022.01) |
| *H04N 1/60* | (2006.01) |

(52) U.S. Cl.
CPC ................ *G06T 15/00* (2013.01); *G06T 7/90* (2017.01); *G06V 10/25* (2022.01); *G06V 10/56* (2022.01); *G06V 10/60* (2022.01); *H04N 1/6005* (2013.01); *G06T 2207/10024* (2013.01)

(58) Field of Classification Search
CPC ......... G06T 15/00; G06T 15/10; G06T 15/20; G06T 15/205; G06T 7/90; G06T 2207/10024; G06V 10/25; G06V 10/56; G06V 10/60; H04N 1/6005; H04N 13/324; H04N 9/3182; H04N 13/327
See application file for complete search history.

(56) References Cited

U.S. PATENT DOCUMENTS

| | | | | |
|---|---|---|---|---|
| 11,361,474 | B2 * | 6/2022 | Tanaka ................... | H04N 17/04 |
| 12,061,341 | B2 * | 8/2024 | Schultz ............. | G02B 27/0172 |
| 2018/0268779 | A1 * | 9/2018 | Nakashima .............. | G09G 5/10 |
| 2020/0043201 | A1 * | 2/2020 | Tanaka ................... | G06F 3/011 |
| 2020/0202611 | A1 | 6/2020 | Wang et al. | |
| 2022/0099975 | A1 * | 3/2022 | Schultz ................... | G09G 3/36 |
| 2024/0029224 | A1 * | 1/2024 | Jiang ....................... | G06T 5/70 |

FOREIGN PATENT DOCUMENTS

| | | |
|---|---|---|
| CN | 112567736 A | 3/2021 |
| CN | 112637579 A | 4/2021 |
| CN | 113508328 A | 10/2021 |
| CN | 115236862 A | 10/2022 |
| JP | 2018157276 A | 10/2018 |

OTHER PUBLICATIONS

International Search Report and Written Opinion in counterpart PCT Application No. PCT/CN2023/074309, dated Oct. 23, 2023.

* cited by examiner

*Primary Examiner* — Vijay Shankar
(74) *Attorney, Agent, or Firm* — FINNEGAN, HENDERSON, FARABOW, GARRETT & DUNNER LLP

(57) ABSTRACT

A method for compensating a virtual image displayed by a near eye display based on a source image. The method includes acquiring virtual images displayed by the near eye display for three primary color channels, wherein each of the virtual images is based on a primary color test pattern; obtaining a correction factor matrix comprising luminance and chromaticity components of the three primary color channels; and performing compensation on the source image with the correction factor matrix.

19 Claims, 12 Drawing Sheets

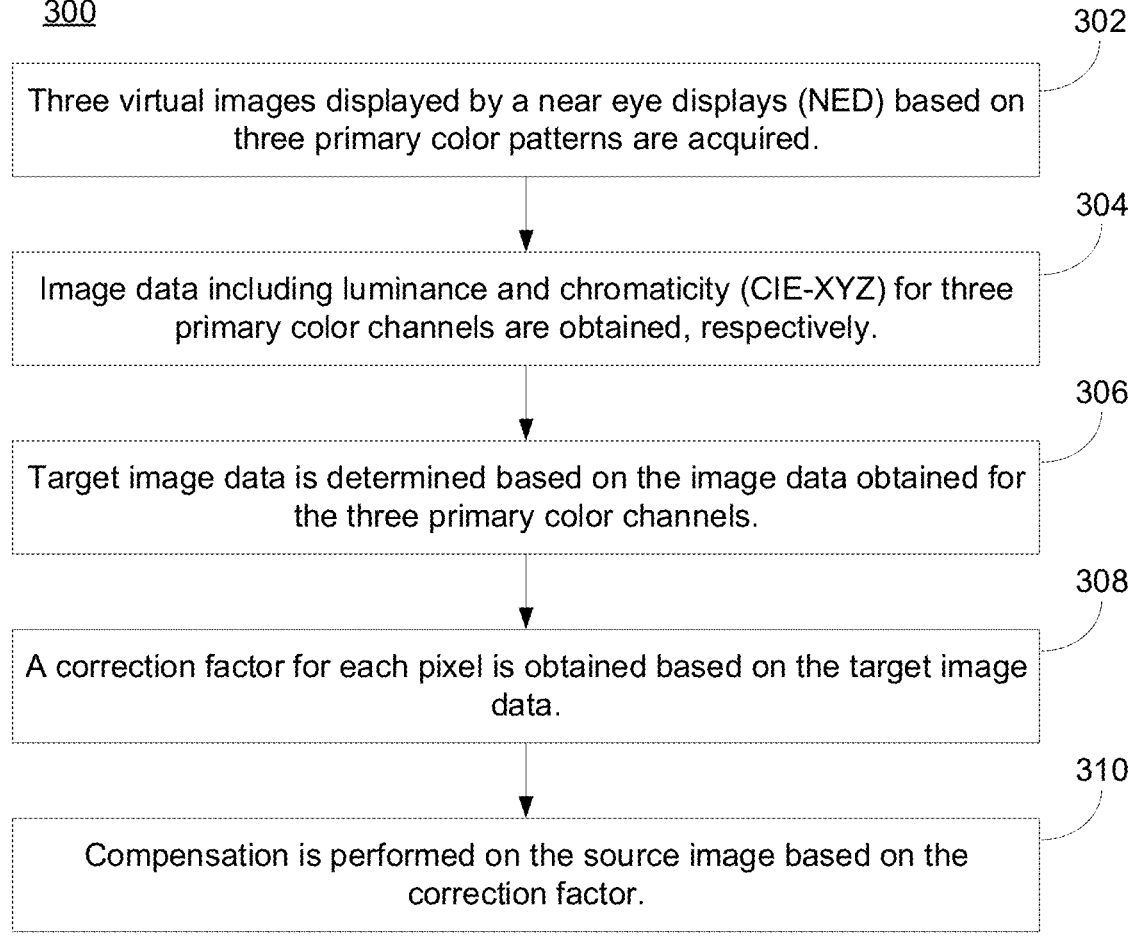

300                                                                                    302

Three virtual images displayed by a near eye displays (NED) based on three primary color patterns are acquired.

304

Image data including luminance and chromaticity (CIE-XYZ) for three primary color channels are obtained, respectively.

306

Target image data is determined based on the image data obtained for the three primary color channels.

308

A correction factor for each pixel is obtained based on the target image data.

310

Compensation is performed on the source image based on the correction factor.

METHODS FOR VIRTUAL IMAGE COMPENSATION

CROSS-REFERENCE TO RELATED APPLICATIONS

The present disclosure claims priority to and the benefits of PCT Application No. PCT/CN2023/074309, filed on Feb. 2, 2023, which is incorporated herein by reference in its entirety.

TECHNICAL FIELD

The present disclosure generally relates to micro display technology, and more particularly, to methods for virtual image compensation.

BACKGROUND

Near-eye displays may be provided as an augmented reality (AR) display, a virtual reality (VR) display, a Head Up/Head Mount or other displays. Generally, a near-eye display usually comprises an image generator and an optical combiner which transfers a projected image from the image generator to human eyes. The optical combiner is a group of reflective and/or diffractive optics, such as freeform mirror/prism, birdbath, or cascaded mirrors, and/or grating coupler (waveguide). Furthermore, the projected image is a virtual image before human eyes. The image generator can be a micro-LED based display, a LCOS (Liquid Crystal on Silicon) display, or a DLP (Digital Light Processing) display. The virtual image is rendered from the image generator and optical combiner to human eyes.

Uniformity is one key performance metric for displays, which is used to evaluate image quality. It normally refers to imperfections of a display matrix, and is called non-uniformity as well. Non-uniformity includes variation in global distribution, and local zones, which is also called mura. For near-eye displays such as AR/VR, a visual artefact such as a mottled, bright, or black spot, or cloud appearance is also observable on the virtual image rendered in the display system. In the virtual image rendered in the AR/VR display, nonuniformity can be shown in luminance and/or chromaticity. Compared to traditional displays, the non-uniformity artefacts are much more obvious due to the closeness to human eyes. Therefore, a method for improving the virtual image quality is desired.

SUMMARY OF THE DISCLOSURE

Embodiments of the present disclosure provide a method for compensating a virtual image displayed by a near eye display based on a source image. The method includes acquiring virtual images displayed by the near eye display for three primary color channels, wherein each of the virtual images is based on a primary color test pattern; obtaining a correction factor matrix comprising luminance and chromaticity components of the three primary color channels; and performing compensation on the source image with the correction factor matrix.

Embodiments of the present disclosure provide a method for compensating a virtual image displayed by a near eye display based on a source image. The method includes acquiring virtual images displayed by the near eye display for three primary color channels, wherein each of the virtual images is based on a primary color test pattern; obtaining an image data matrix for the three primary color channels based on the virtual images, and inverting the image data matrix to obtain an inverted image data matrix; determining a target image data matrix for the three primary color channels; obtaining a correction factor matrix by multiplying the inverted image data matrix and the target image data matrix; and performing compensation on the source image based on the correction factor matrix.

BRIEF DESCRIPTION OF THE DRAWINGS

Embodiments and various aspects of the present disclosure are illustrated in the following detailed description and the accompanying figures. Various features shown in the figures are not drawn to scale.

FIG. 3 illustrates a flow chart of an exemplary method for compensating a virtual image, according to some embodiments of the present disclosure.

DETAILED DESCRIPTION

Figure 1:
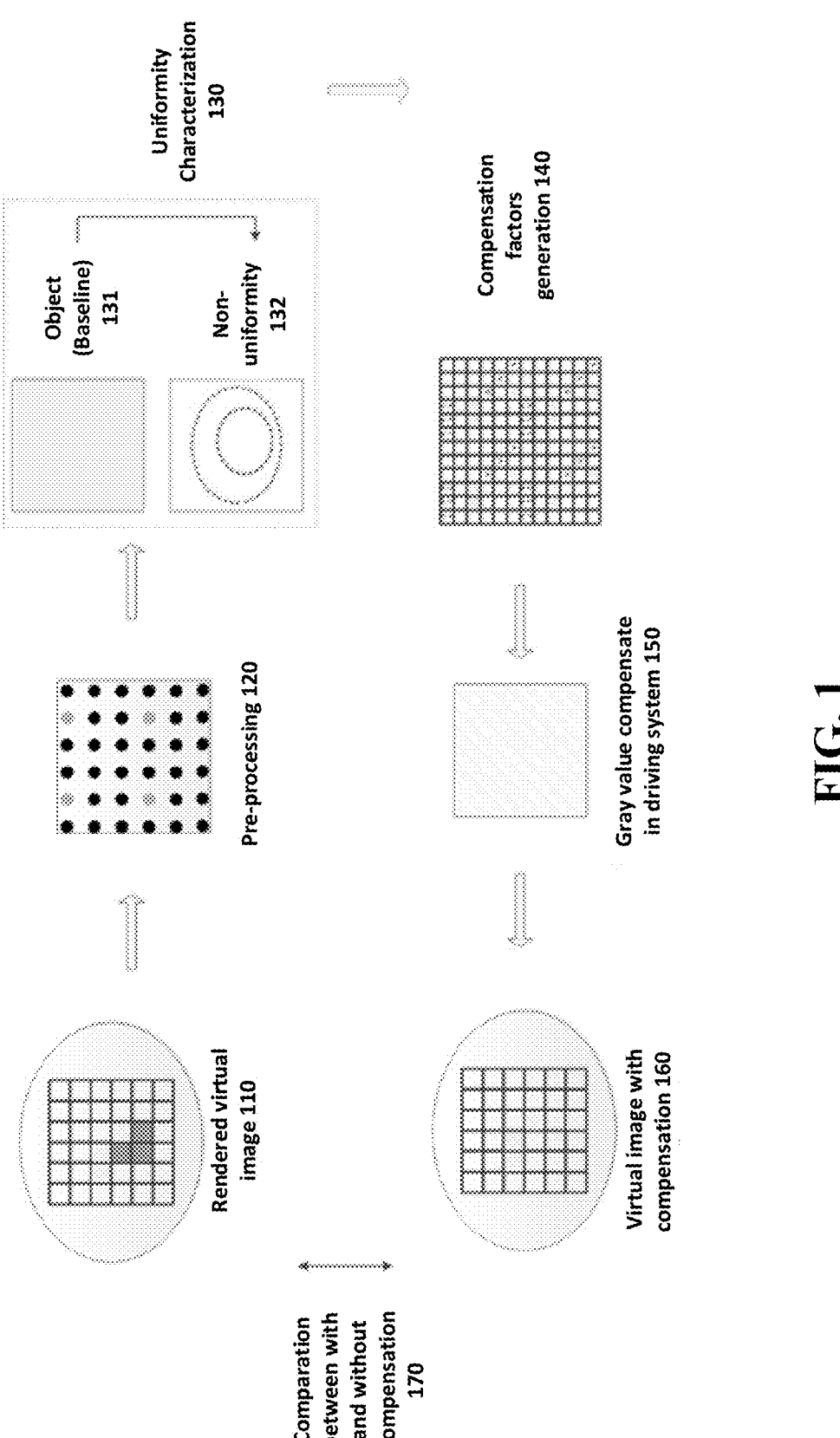
FIG. 1 shows a framework of a uniformization method for improving image quality, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The "Commission Internationale de l'éclaireage" (in French), known in English as the International Commission on Illumination, defined a standard CIE-1931 for quantifying physical properties of color received by the human eye. CIE-1931 color spaces quantitatively define links between distributions of wavelengths in the electromagnetic visible spectrum, and physiologically perceived colors in human color vision. Mathematical relationships of CIE-1931 that define these color spaces are tools for color management, and used when dealing with, e.g., color inks, illuminated displays, and recording devices such as digital cameras.

CIE-1931 color spaces include a CIE-RGB color space and a CIE-XYZ color space. The CIE-RGB color space is one of many RGB color spaces, distinguished by a particular set of nonchromatic (single-wavelength) primary colors. The CIE-XYZ color space encompasses all color sensations that are visible to a person with average eyesight. Therefore, CIE-XYZ (tristimulus values) is a device-invariant representation of color. It serves as a standard reference against which many other color spaces are defined. The CIE-1931 color space defines the resulting tristimulus values, in which they are denoted by X, Y, and Z. Y is luminance, Z is quasi-equal to blue (of CIE-RGB), and X is a mix of three CIE-RGB curves chosen to be nonnegative. Setting Y as luminance has the useful result that for any given Y value, the XZ plane will contain all possible chromaticities at that luminance.

Since the human eye has three types of color sensors that respond to different ranges of wavelengths, a full plot of all visible colors is a three-dimensional figure. However, the concept of color can be divided into two parts: luminance and chromaticity. The CIE-XYZ color space was deliberately designed so that the Y parameter is also a measure of the luminance of a color. The chromaticity is then specified by two derived parameters x and y, which are two of the three normalized values being functions of all three tristimulus values X, Y, and Z according to:

$$x = \frac{X}{X+Y+Z},$$ (Eq. 1)

$$y = \frac{Y}{X+Y+Z},$$

$$z = \frac{Z}{X+Y+Z} = 1 - x - y.$$

The derived color space defined by x, y, and Y is known as the CIE-xyY color space. The X and Z tristimulus values can be calculated back from the chromaticity values x and y and the Y tristimulus value, according to the following equations.

$$X = \frac{Y}{y}x,$$ (Eq. 2)

$$Y = Y,$$

-continued $$Z = \frac{Y}{y}(1 - x - y).$$

In colorimetry, CIE-1976 L*, u*, v* color space, commonly known by its abbreviation CIE-LUV, is a color space adopted by the CIE in 1976, as a simple-to-compute transformation of the 1931 CIE-XYZ color space, which attempted perceptual uniformity. There are three components represented in the CIE-1976 color space: a luminance component (L) and two chrominance components u and v.

Grey level or grey value of an image indicates the luminance of a pixel. The minimum grey value is 0. The maximum grey value depends on a digitization depth of the image. For example, for an 8-bit-deep image, the maximum grey value is 255. In a color image the grey value of each pixel can be calculated with three primary color components:

$$Grey\ value = 0.299 \times R + 0.587 \times G + 0.114 \times B$$ (Eq. 3)

where R refers to red component, G refers to green component, and B refers to blue component. The formula takes into account the color sensitivity of the human eye and makes the presentation of the grey levels independent of color and limited solely to the luminance of the individual pixels.

Nonuniformity can be compensated to improve image quality, by developing and integrating a uniformization (also referred to as demura) algorithm into a display driving system. Demura refers to a process for eliminating/suppressing visual artefacts and achieving relative uniformity for luminance and/or color in a display.

According to some embodiments of the present disclosure, compensation methods and systems for improving uniformity in near-eye displays are provided.

FIG. 1 shows a framework of a uniformization method for improving image quality, according to some embodiments of the present disclosure. Referring to FIG. 1, a rendered virtual image 110 displayed by a near-eye display (NED) is acquired by an imaging light measuring device (LMD). After the virtual image is pre-processed (including a processing of registration) 120, a uniformity of the virtual image is characterized 130 for compensation calculation by comparing to a baseline (e.g., a target image data, a target matrix, etc.) 131 to obtain a non-uniformity 132. Compensation factors for a pixel matrix are generated 140, with consideration of a non-uniformity matrix and a target matrix. Grey values of the pixel matrix are adjusted 150, according to a compensation factor for each pixel of an image generator, to obtain a rendered virtual image with compensation 160. The rendered virtual image with compensation 160 can be re-evaluated. Finally, the rendered virtual image with compensation 160 is compared with the rendered virtual image without compensation 110 to determine a uniformity improvement quality (e.g., NU (non-uniformity)<=10%) 170.

Figure 2:
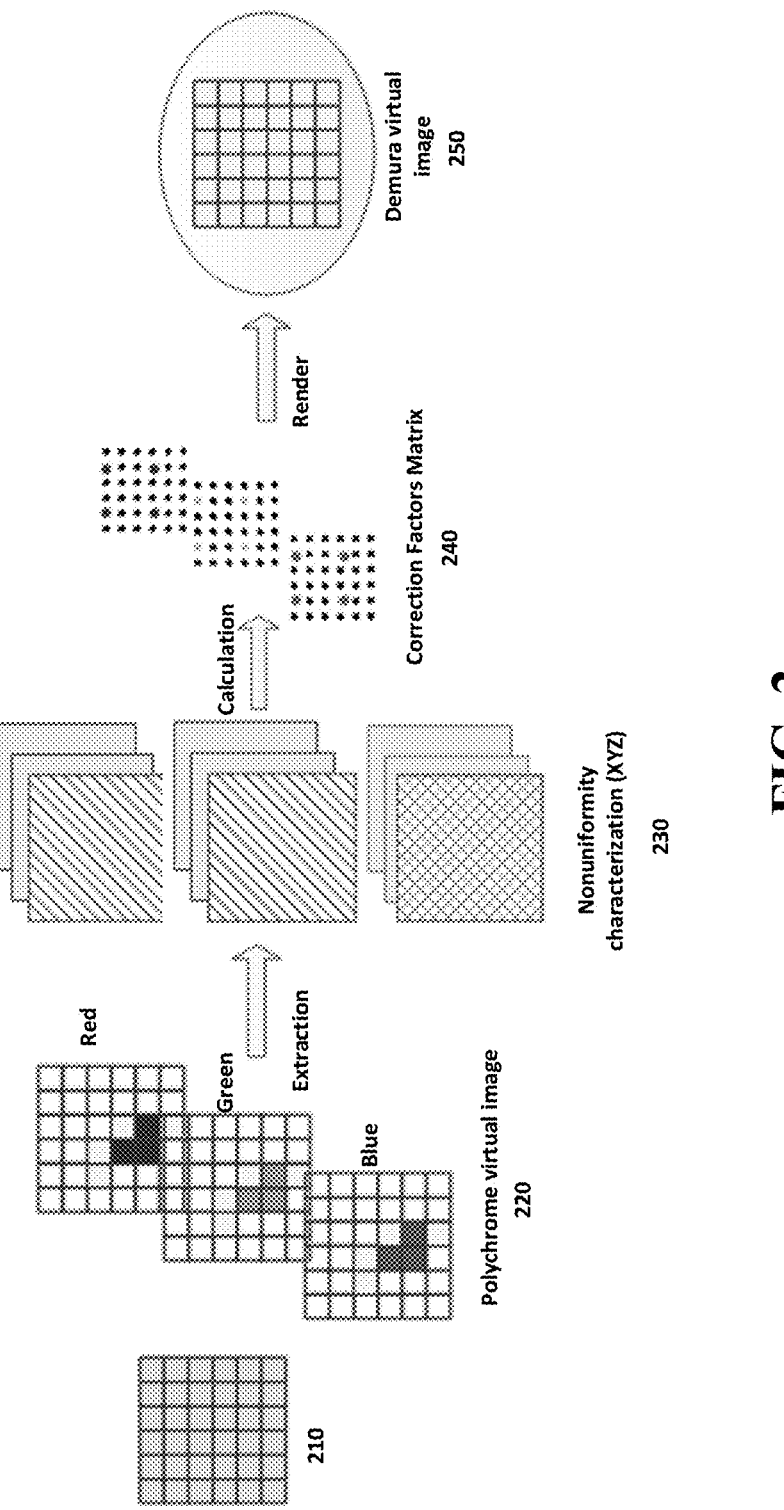
FIG. 2 shows another framework of a uniformization method for improving image quality using three primary color channels, according to some embodiments of the present disclosure.

FIG. 2 shows another framework of a uniformization method for improving image quality using three primary color channels, according to some embodiments of the present disclosure. Referring to FIG. 2, a rendered virtual image 210 can be generated, specifically, polychrome virtual images 220 can be generated for three primary color channels, for example, a red channel, a green channel, and a blue channel. Then a non-uniformity characterization 230 can be extracted from the polychrome virtual images 220 respectively for each primary color channel. In some embodiments, the characteristic of each virtual image 220 includes image data (i.e., X, Y, Z) in CIE-XYZ color space. A correction factors matrix 240 is obtained based on the non-uniformity characterization 230 extracted from each primary color channel. Compensation can be performed with a correction factor matrix 240, and a demura virtual image 250 can be generated after the compensation.

With the correction factor matrix for three primary color channels, the compensation can be more accurate.

In some embodiments, a method for compensating a virtual image is provided. FIG. 3 illustrates a flow chart of an exemplary method 300 for compensating a virtual image, according to some embodiments of the present disclosure. Referring to FIG. 3, method 300 includes steps 302 to 310.

At step 302, three virtual images displayed by a near eye display (NED) based on three primary color patterns are acquired. Each of the virtual images is rendered by the NED, and displayed by a micro display projector of the NED to human eyes. A virtual image is formed by a source image which is emitted from a micro display projector and transmitted through an optical combiner (e. g. waveguide) toward the front of human eyes. To characterize the non-uniformity of the virtual image for further compensation calculation, the virtual image is captured by an imaging LMD (light measuring device). In some embodiments, the LMD can be a colorimeter or an imaging camera, such as a CCD (charge coupled device) or a CMOS (complementary metal oxide semiconductor). Grey value and/or luminance and chromaticity distribution of the virtual image is obtained in a full view field of the virtual image. Therefore, grey values and/or luminance and chromaticity values of each pixel of the virtual image are obtained, also referred to as image data. A test pattern can be applied as a source image. In some embodiments, the source image is a full white image (e.g., a full white test pattern), and the virtual image is a full white image. In this example, three primary color test patterns (e.g., red test pattern, green test pattern, and blue test pattern) are applied. Therefore, three primary color virtual images can be obtained respectively with the three test patterns. In some embodiments, the source image includes a plurality of partial-on patterns, instead of a full pattern. The plurality of partial-on patterns are stacked together to form a full pattern. For example, three partial-on patterns are rendered to the NED in sequence. Finally, a full screen virtual image is obtained. In some embodiments, one or more images with various grey/luminance can be rendered in the NED.

Figure 4A:
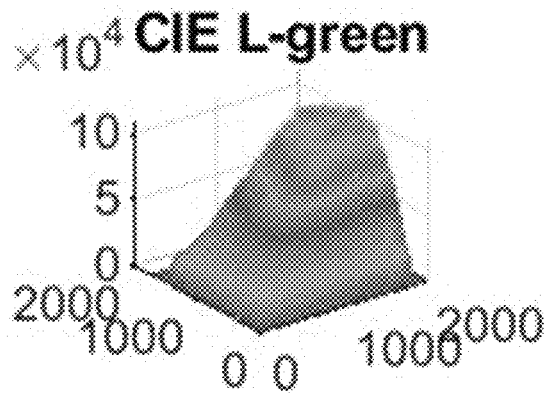
FIG. 4A to FIG. 4C illustrate exemplary distributions of luminance and chromaticity for a green primary color channel, according to some embodiments of the present disclosure.
Figure 4B:
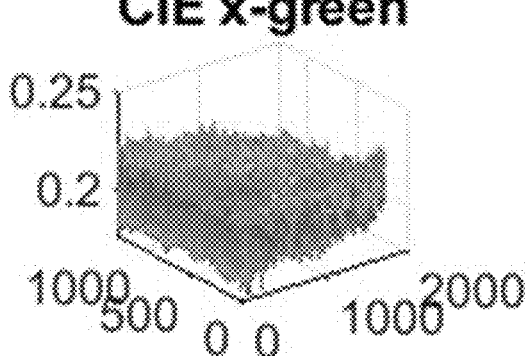
Figure 4C:
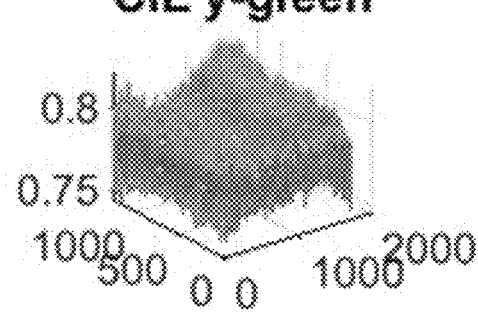
Figure 5:
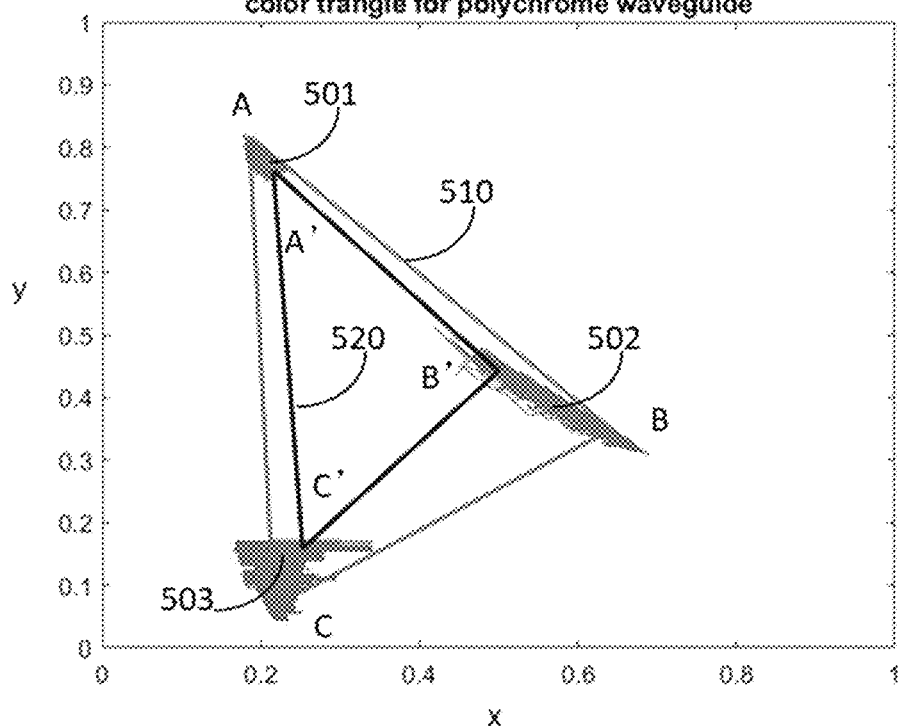
FIG. 5 shows an exemplary pixel distribution and color triangle in a color space, according to some embodiments for the present disclosure.

At step 304, image data including luminance and chromaticity (CIE-XYZ) for three primary color channels are obtained, respectively. In some embodiments, the image data (i.e., x, y, Y) in CIE-xyY color space for three primary color channels are obtained through a transformation from CIE-XYZ. FIG. 4A to FIG. 4C illustrate exemplary distributions of luminance and chromaticity for a green primary color channel, according to some embodiments of the present disclosure. FIG. 4A shows an example of luminance (L) in color space CIE-xyY, corresponding to a value of Y. FIG. 4B and FIG. 4C show an example of chromaticity distribution, i.e., CIE-x and CIE-y, in the color space CIE-xyY. FIG. 5 shows an exemplary pixel distribution and color triangle in color space CIE-xyY, according to some embodiments for the present disclosure. The x, y axes represent relative values for two components of the chromaticity. As shown in FIG. 5, the image data of CIE-xy for the green primary color channel shown in FIG. 4B to FIG. 4C can be projected to an XY-plane, for example, a green region 501 on the left-top, where Z=0. The axes of x and y shown in FIG. 5 correspond to a color coordination of CIE-xy, and each value of the x and y is between 0 and 1. Referring to FIG. 5, the image data of the three primary color channels can be projected on the same XY-plane, for example, a red region 502 on the right and a blue region 503 on the left-bottom. Then, a color triangle 510 illustrating the chromaticity distribution for the virtual image is obtained by connecting regions 501, 502, and 503 and having vertices A, B, and C. In some embodiments, the color triangle 510 is a triangle with a largest area for illustrating the chromaticity distribution for the virtual image.

In some embodiments, image data (i.e., X, Y, Z) in CIE-XYZ color space for three primary color channels are extracted for each primary color channel first. Then, the image data (i.e., X, Y, Z) is converted to image data (i.e., x, y, Y) in the CIE-xyY color space according to Eq. 1.

In some embodiments, the image data of a pixel for the three primary color channels in CIE-XYZ color space is a matrix, for example, represented as $$[M_{3X3}] = \begin{bmatrix} X_R & X_G & X_B \\ Y_R & Y_G & Y_B \\ Z_R & Z_G & Z_B \end{bmatrix}$$

At step 306, target image data is determined based on the image data obtained for the three primary color channels. Referring back to FIG. 5, in CIE-xyY color space, the target image data can be determined according to a target color triangle 520 which is obtained based on the pixel chromaticity distribution 501~503. The color triangle 520 having vertices A', B', and C' formed by the target image data of each primary color channel is within the color triangle 510. In some embodiments, the target color triangle 520 is determined as a color triangle with a smallest region. In some embodiments, the target color triangle 520 is determined based on a preset threshold. The target image data includes image data (i.e., x, y, Y) for each primary color channel.

In some embodiments, the target image data in CIE-xyY color space is converted to target image data in CIE-XYZ color space (i.e., X, Y, Z). The conversion can be performed based on Eq. 2 as described above. It can be understood that the target image data of a pixel for the three primary color channels in CIE-XYZ color space is a matrix.

At step 308, a correction factor for each pixel is obtained based on the target image data. In some embodiments, the correction factor is obtained as a matrix with a plurality of components corresponding to components in image data (e.g., X, Y, Z in CIE-XYZ color space, R, G, B in CIE-RGB color space, or x, y, Y in CIE-xyY color space, etc.). In some embodiments, the correction factor matrix is obtained by calculating a target image data matrix and an image data matrix obtained in step 302. In some embodiments, the correction factor for each pixel is calculated with respect to the luminance and chromaticity uniformization. In some embodiments, a correction matrix including correction factors can be obtained using the following Eq. 4.

$$\begin{cases} [M_{3X3}]_{corr} = inv[M_{3X3}]_{px} \times [M_{3X3}]_{target} & \text{(Eq. 4)} \\ [M_{3X3}]_{px} = \begin{bmatrix} X_R & X_G & X_B \\ Y_R & Y_G & Y_B \\ Z_R & Z_G & Z_B \end{bmatrix}_{px} \\ [M_{3X3}]_{target} = \begin{bmatrix} X_R & X_G & X_B \\ Y_R & Y_G & Y_B \\ Z_R & Z_G & Z_B \end{bmatrix}_{target} \end{cases}$$

where $[M_{3\times3}]_{target}$ represents target image data of all three primary color channels in a 3×3 matrix, for example, obtained in step 306. $[M_{3\times3}]_{px}$ represents image data for each pixel for all three primary color channel obtained from the virtual image, for example, in step 302. $[M_{3\times3}]_{corr}$ is the correction factor matrix, which is used for further compensation. $inv[M_{3\times3}]_{px}$ is an inverted matrix of $[M_{3\times3}]_{px}$.

In some embodiments, the correction factor matrix is a non-diagonal matrix, that is, the correction factor matrix includes chromaticity correction component(s), which improves the accuracy of compensation for each pixel.

At step 310, compensation is performed on the source image based on the correction factor. After the correction factor is obtained, grey values for each pixel can be adjusted to eliminate the nonuniformity in a whole display matrix. The image data after compensation can be obtained using the following Eq. 5.

$$\begin{bmatrix} r_{out} \\ g_{out} \\ b_{out} \end{bmatrix}_{px} = \qquad\qquad \text{(Eq. 5)}$$

$$\begin{bmatrix} \alpha_r & \alpha_g & \alpha_b \\ \beta_r & \beta_g & \beta_b \\ \gamma_r & \gamma_g & \gamma_b \end{bmatrix}_{corr} \times \begin{bmatrix} r_{in} \\ g_{in} \\ b_{in} \end{bmatrix}_{px} \left( \begin{bmatrix} \alpha_r & \alpha_g & \alpha_b \\ \beta_r & \beta_g & \beta_b \\ \gamma_r & \gamma_g & \gamma_b \end{bmatrix}_{corr} = [M_{3X3}]_{corr} \right)$$

where $$\begin{bmatrix} r_{out} \\ g_{out} \\ b_{out} \end{bmatrix}_{px}$$

represents grey values for each primary color channel (e.g., red, green, and blue) after compensation of each pixel, $$\begin{bmatrix} r_{in} \\ g_{in} \\ b_{in} \end{bmatrix}_{px}$$

represents grey values for each primary color channel of the source image (i.e., before compensation) of each pixel. $\alpha$, $\beta$, $\gamma$ represent components in the correction factor matrix.

Therefore, the input grey values for three sub pixels $$\begin{bmatrix} r_{in} \\ g_{in} \\ b_{in} \end{bmatrix}$$

are adjusted and output as $$\begin{bmatrix} r_{out} \\ g_{out} \\ b_{out} \end{bmatrix}.$$

In some embodiments, a re-evaluation of the virtual image after correction of the source image can be performed. To evaluate the quality of improvement with the above-described compensation method, the uniformity on the rendered virtual image is evaluated before and after correction for comparison. A plurality of standards are promulgated for device measurement by the International Electrotechnical Commission (IEC), for example, standard IEC 63145 is used for eyewear displays. A nine point measurement (according to IEC 63145) can be performed to evaluate uniformity in luminance and chromaticity.

Figure 6A:
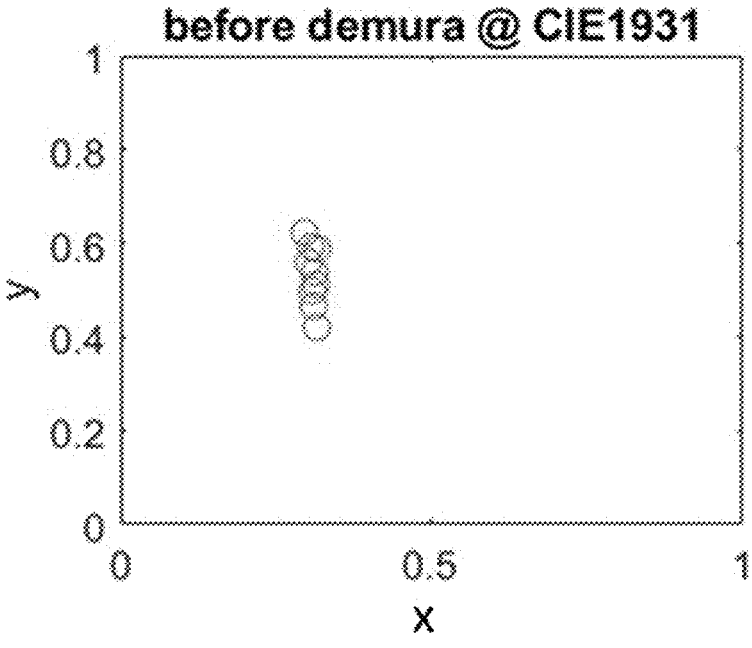
FIG. 6A and FIG. 6B illustrate nine point color coordinators before and after demura in a color space, according to some embodiments of the present disclosure.
Figure 6B:
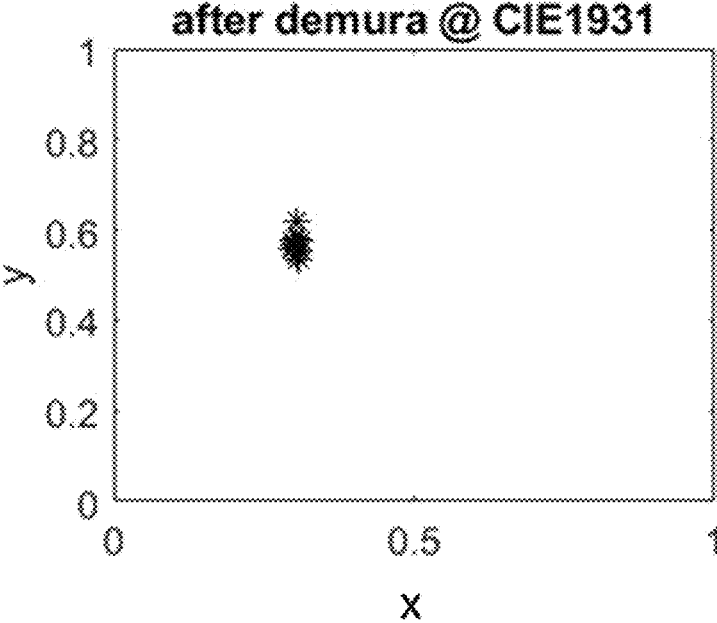
Figure 7A:
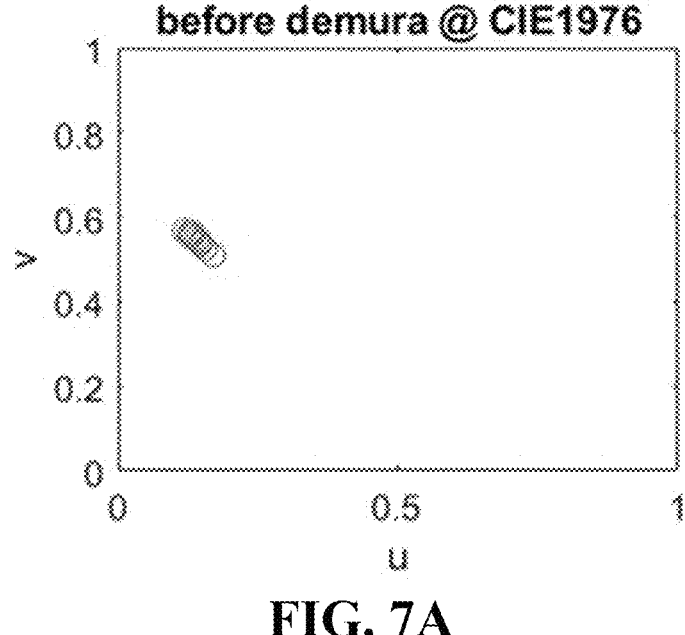
FIG. 7A and FIG. 7B illustrate nine point color coordinators before and after demura in another color space, according to some embodiments of the present disclosure.
Figure 7B:
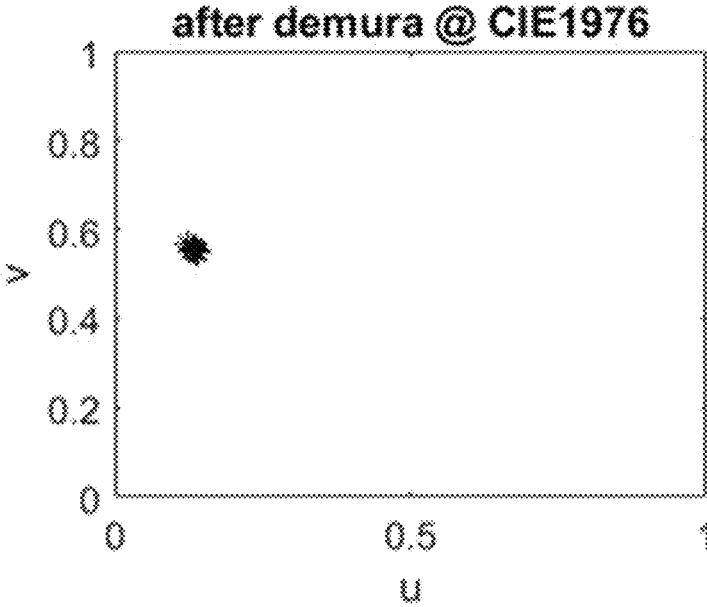

FIG. 6A and FIG. 6B show nine point color coordinators of a virtual image before and after demura in color space CIE-1931, according to some embodiments of the present disclosure. FIG. 7A and FIG. 7B show nine point color coordinators before and after demura in color space CIE-1976, according to some embodiments of the present disclosure. The axes of u and v shown in FIG. 7A and FIG. 7B correspond to a color coordination with a relative value between 0 and 1. As shown in FIG. 6A and FIG. 7A, before demura, the variation among nine points is significant as to the dispersion of the points in the color space. After demura, as shown in FIG. 6B and FIG. 7B, the nine points tend to be consistent and concentrate in the color space, indicating that uniformity has been dramatically improved.

Figure 8:
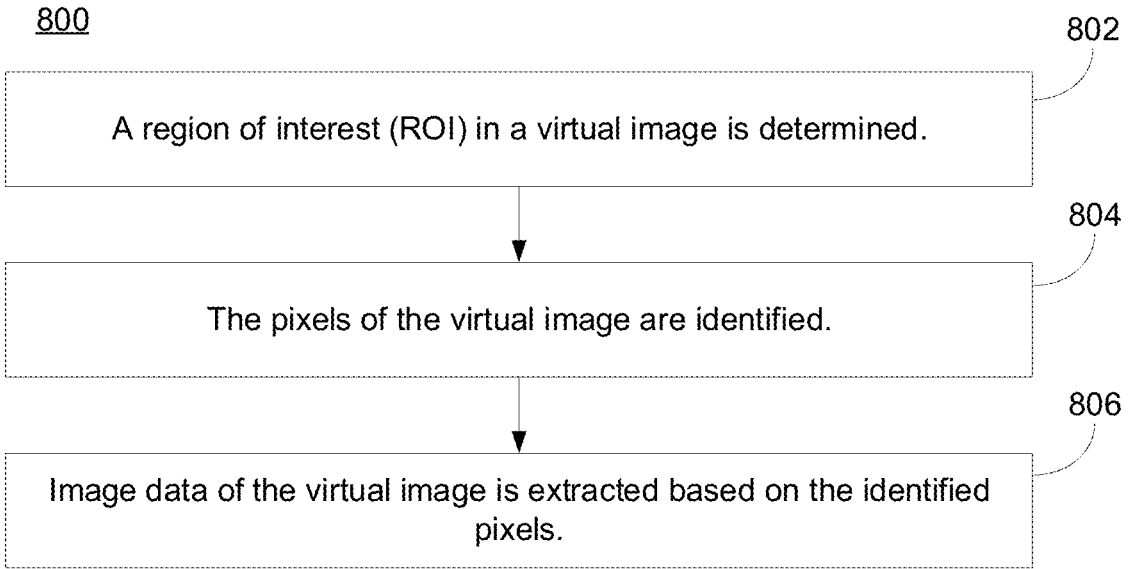
FIG. 8 show a flowchart of an exemplary pixel registration method, according to some embodiments of the present disclosure.

In some embodiments, after step 302 in which the virtual image is acquired, a pixel registration process is performed, to map the captured virtual image to a matrix array of the image generator and preprocess the virtual image. In an example, the image data of the virtual image is 9000×6000 pixels and the matrix array of the image generator is 640×480 pixels. Accordingly, the 9000×6000 pixels need to be registered to the array of 640×480 pixels for further compensation. FIG. 8 show a flowchart of an exemplary pixel registration method 800, according to some embodiments of the present disclosure. Referring to FIG. 8, the pixel registration method 800 includes steps 802 to 806.

Figure 9:
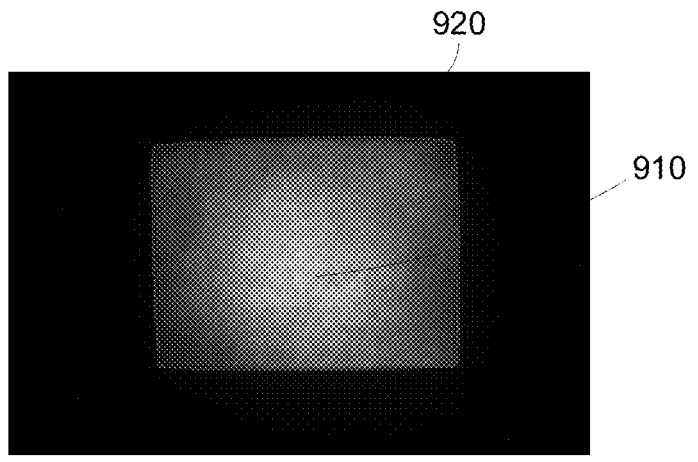
FIG. 9 shows an exemplary determined region of interest from the image data, according to some embodiments of the present disclosure.

At step 802, a region of interest (ROI) in a virtual image is determined. The image data in the ROI of the virtual image is subjected to compensation. In some embodiments, the ROI can be determined by a preset threshold. FIG. 9 shows an exemplary determined ROI 910 from image data, according to some embodiments of the present disclosure. Referring to FIG. 9, ROI 910 of a full view field of virtual image is determined based on a predefined threshold. In some embodiments, the ROI is determined by comparing a value of image data for each pixel with the threshold. For example, the ROI can be determined according to Eq. 6:

$$G_{pixel} \geq G_{threshold} \qquad\qquad \text{(Eq. 6)}$$

wherein the threshold $G_{threshold}$ can be set according to an image histogram, and $G_{pixel}$ represents a value of image data of a pixel, G represent a grey value. For example, the threshold may be set as a grey value that is less than ten percent of the whole grey scale (255), for example, the threshold is set as 225.

In some embodiments, the virtual image is divided into the ROI and a dark region around the ROI, for example, referring to FIG. 9, a dark region 920.

In some embodiments, noise spots are excluded from the ROI. In some embodiments, the noise spots are excluded from the ROI by evaluating an emitting area and background region of the virtual image.

Figure 10:
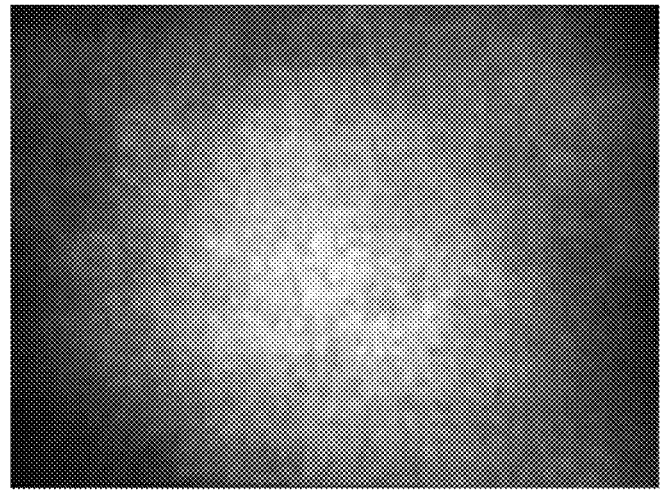
FIG. 10 shows an exemplary image after distortion correction, according to some embodiments of the present disclosure.

In some embodiments, a distortion correction is further performed on the ROI. The captured virtual image is distorted with an LMD lens as well as a DUT (device under test) module. To obtain accurate distribution data, the captured image needs to be undistorted, that is, distortion corrected by remapping the geometric pixel matrix. Normally, the distortion is observed (e.g., a barrel distortion), and a reverse transformation is correspondingly applied to correct the distortion. In some embodiments, a distortion can be corrected by Eq. 7-1 and Eq. 7-2.

$$x_{corr} = x_{orig}\left(1 + k_1 r^2 + k_2 r^4 + k_3 r^6\right) \quad \text{(Eq. 7-1)}$$

$$y_{corr} = y_{orig}\left(1 + k_1 r^2 + k_2 r^4 + k_3 r^6\right) \quad \text{(Eq. 7-2)}$$

where $(X_{corr}, Y_{corr})$ are the coordinates of a pixel after distortion correction, corresponding to original coordinates $(X_{orig}, Y_{orig})$. The term r represents a distance of the pixel to a center of the virtual image. The term $k_1$, $k_2$, $k_3$ are coefficients of distortion parameters. In some embodiments, a tangential distortion can be also corrected. FIG. 10 shows an exemplary image after distortion correction, according to some embodiments of the present disclosure.

At step 804, the pixels in the ROI of the virtual image are identified. That is, a mapping ratio between the source image and the virtual image is calculated. In some embodiments, each pixel of an image generator/source can be extracted by a method of evaluating a mapping ratio and full field size of the virtual image.

Figure 11:
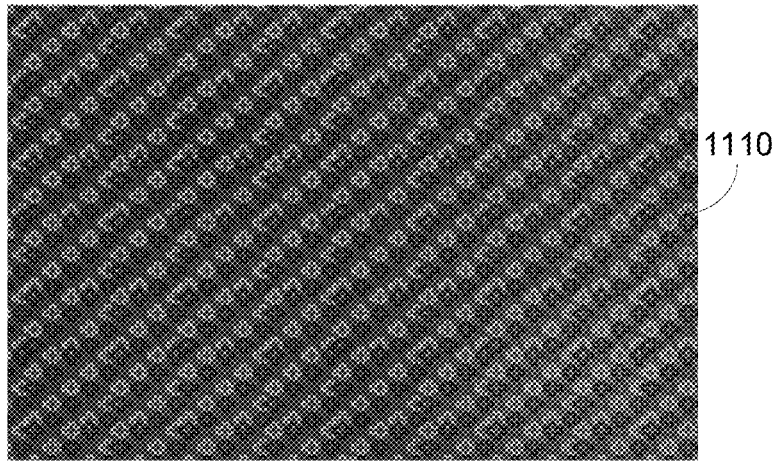
FIG. 11 shows an example of pixel registration from a virtual image to an image source with a mapping ratio 5, according to some embodiments of the present disclosure.

Since the virtual image is captured by a higher resolution imaging LMD, the virtual image is much larger than the source image. For example, the mapping ratio is 3 or 5 between the virtual image and the source image. FIG. 11 shows an example of pixel registration from a virtual image to an image source with mapping ratio 5, according to some embodiments of the present disclosure. Each unit zone 1110 (shown as a cross) represents an extracted pixel of the image source. In some embodiments, the mapping ratio is determined by a full field size of the virtual image, a full field size of the source image, a dimension of the virtual image, and a dimension of the source image. For example, the mapping ratio is calculated by Eq. 8-1 to Eq. 8-3:

$$R = R_1/R_2 \quad \text{(Eq. 8-1)}$$

$$R_1 = D_1/FOV_1 \quad \text{(Eq. 8-2)}$$

$$R_2 = D_2/FOV_2 \quad \text{(Eq. 8-3)}$$

wherein, R is the mapping ratio, $D_1$ is a dimension of an imaging LMD which is used to acquire the virtual image, $FOV_1$ is an active field of view of the imaging LMD, $D_2$ is an active emitting area of a micro light emitting array in the micro display projector, and $FOV_2$ is an active field of view of the micro display projector. In some embodiments, the micro display projector includes a micro display panel and a lens. The micro display panel includes a micro light emitting array which can form the active emitting area. For example, the micro display panel is a micro inorganic-LED (light-emitting diode) display panel, a micro-OLED (organic light-emitting diode) display panel, or a micro-LCD (liquid crystal display) display panel.

Figure 12:
FIG. 12 illustrates an example of a preprocessed image in pixel registration (640×480), according to some embodiments of the present disclosure.

FIG. 12 illustrates an example preprocessed image in pixel registration (640×480), according to some embodiments of the present disclosure. As shown in FIG. 12, a 9000×6000 pixels has been registered to the array of 640×480 pixels.

At step 806, image data of the virtual image is extracted based on the identified pixels. In some embodiments, the image data includes a grey value of each pixel. In some embodiments, the image data includes luminance (Lum) and chromaticity (x, y) for each pixel, which can be derived from the grey value.

With the pixel registration process, pixels in a virtual image can be correlated to the pixels in source image, e.g., the matrix array of the image generator. The compensation performed on the pixels of the matrix array can improve the display performance of virtual image.

Figure 13:
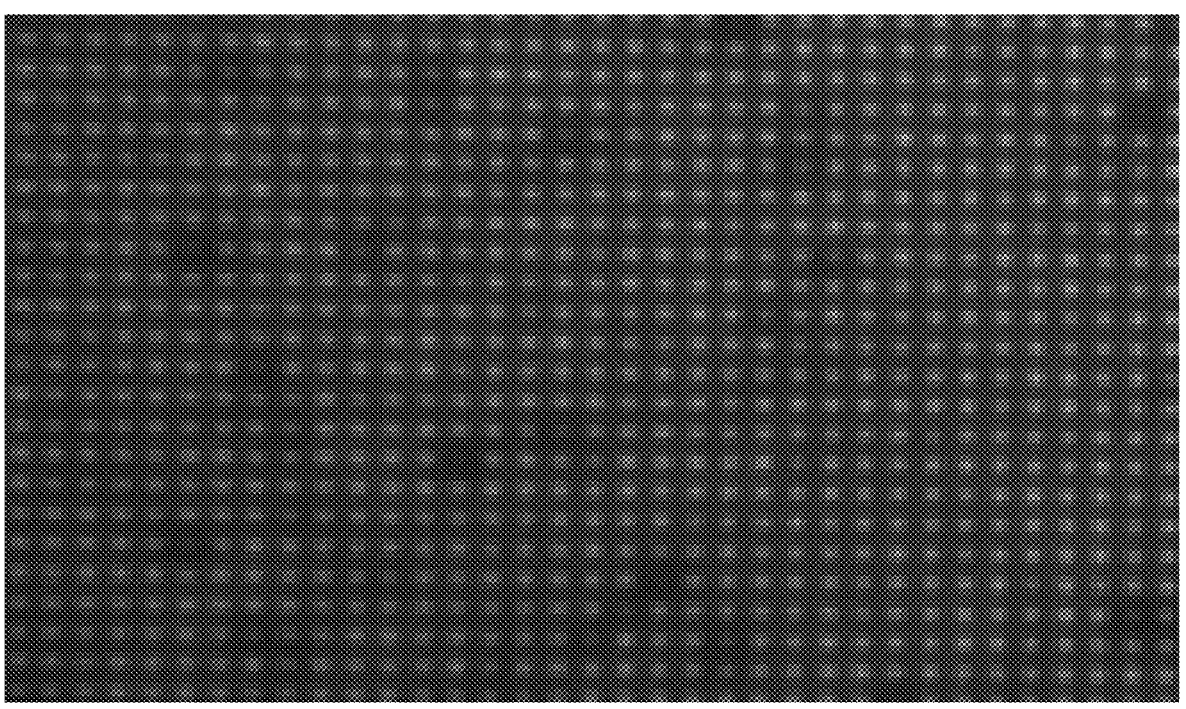
FIG. 13 shows an exemplary 3×3 partial on-off positioning pattern, according to some embodiments of the present disclosure.

In some embodiments, the pixels in source image are identified by image processing such as morphology and feature extraction. The position of a pixel in source image can be determined through a morphological image processing (e.g., dilation/erosion etc.). To avoid crosstalk among pixels and identify the pixels in source image accurately, a partial on-off method may be used for position, in which the pixels in source image are turn-on in interval with two neighbors not on simultaneously. FIG. 13 shows an exemplary 3×3 partial on-off positioning pattern, according to some embodiments of the present disclosure. In this example, only one pixel is on in a 3×3 matrix space. The pixel position for all pixels can derivated through one identified positioning pattern and unified pixel distance. Furthermore, the CIE-XYZ data for matrix pixels are extracted according to the identified pixel position/region.

Figure 14:
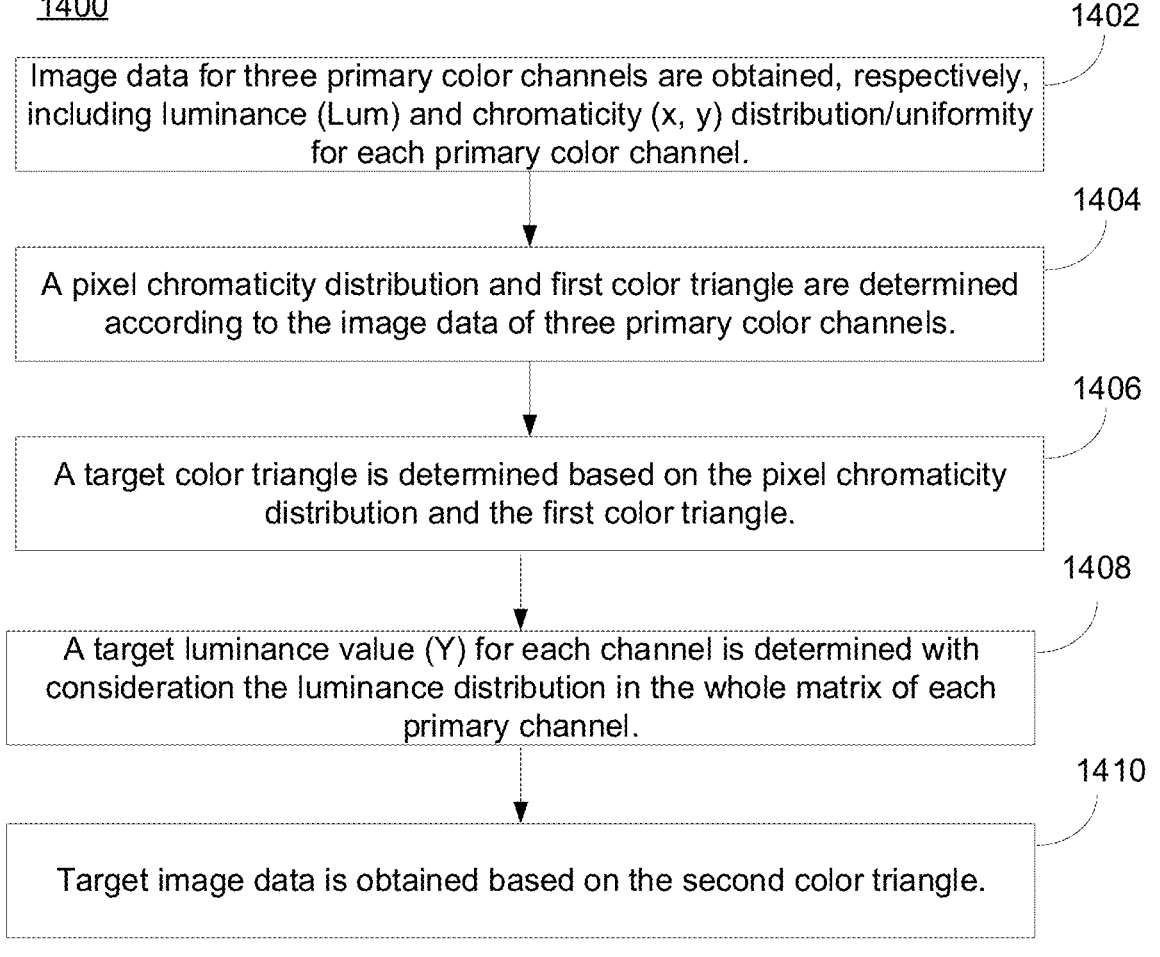
FIG. 14 shows a flowchart illustrating a target image data determination method, according to some embodiments of the present disclosure.

In some embodiments, to obtain the target image data in CIE-XYZ color space, a method for determining the target image data is performed. FIG. 14 shows a flowchart illustrating a target image data determination method 1400, according to some embodiments of the present disclosure. Referring to FIG. 14, the method 1400 includes steps 1402 to 1408.

At step 1402, image data for three primary color channels are obtained, respectively, including luminance (Lum) and chromaticity (x, y) distribution/uniformity for each primary color channel. In some embodiments, the image data (i.e., x, y, Y) in CIE-xyY color space for three primary color channels are obtained. Previously described FIG. 4A to FIG. 4C illustrate exemplary distributions of luminance and chromaticity for a green primary color channel, according to some embodiments of the present disclosure. FIG. 4A shows an example of luminance (L) in color space CIE-xyY, corresponding to a value of Y. FIG. 4B and FIG. 4C show an example of chromaticity distribution, i.e., CIE-x and CIE-y, in a color space CIE-xyY.

In some embodiments, image data (i.e., X, Y, Z) in CIE-XYZ color space for three primary color channels are extracted for each primary color channel first. Then, the image data (i.e., X, Y, Z) is converted to image data (i.e., x, y, Y) in the CIE-xyY color space according to Eq. 1.

In some embodiments, the image data of a pixel for the three primary color channels in CIE-XYZ color space is a matrix, for example, represented as $$[M_{3X3}] = \begin{bmatrix} X_R & X_G & X_B \\ Y_R & Y_G & Y_B \\ Z_R & Z_G & Z_B \end{bmatrix}$$

At step 1404, a pixel chromaticity distribution and first color triangle are determined according to the image data of three primary color channels. Referring back to FIG. 5, the image data of CIE-xyY for the green primary color channel shown in FIG. 4A to FIG. 4C can be projected to the XY-plane, for example, the green region 501 on the left-top, where Z=0. The image data of the three primary color channels can be projected on the same XY-plane, for example, referring back to FIG. 5, a red region 502 on the right, a blue region 503 on the left-bottom. Then, a first color triangle 510 illustrating the chromaticity distribution for the virtual image is obtained. In some embodiments, the color triangle 510 is a triangle with a largest area for illustrating the chromaticity distribution for the virtual image.

At step 1406, a target color triangle is determined based on the pixel chromaticity distribution and the first color triangle.

A target color triangle for determining target image data can be determined or selected based on the first color triangle. Referring back to FIG. 5, in CIE-xyY color space, the target color triangle 520 can be determined according to the pixel chromaticity distribution and color triangle 510.

In some embodiments, the target color triangle 520 is determined based on a preset threshold. For example, a first target vertex A' for green is determined by selecting a point with an x value being greater than that of the vertex A and/or a y value being less than that of the vertex A. A second target vertex B' for red is determined by selecting a point with an x value being less than that of vertex B. A third target vertex C' for blue is determined by selecting a point with an x value being greater than that of the vertex C and/or a y value being greater than that of the vertex C.

In some embodiments, the target color triangle 520 is determined by selecting vertexes within the color triangle 510. In some embodiments, the target color triangle 520 is determined as a color triangle with a smallest region, where the three vertexes of the target color triangle are on the edges of each color region.

At step 1408, a target luminance value (Y) for each channel is determined with consideration the luminance distribution in the whole matrix of each primary channel. In some embodiments, the Y component of the target image data, i.e., the target luminance component, is the same as the Y component of the acquired image data for each primary color channel. In some embodiments, the target luminance value for each channel is calculated by an average value of the distribution as shown in Eq. 9.

$$Y_{target|ch} = \text{mean}\left(Y_{matrix|ch}\right) \qquad \text{(Eq. 9)}$$

$Y_{target|ch}$ represents a target luminance level, and $Y_{matrix|ch}$ is the luminance distribution of the whole pixel matrix in each primary channel (e.g., R, G, and B). The function mean (M) represents calculating an average value of a matrix M. In some embodiments, the target luminance level can be determined by self-definition or histogram for extraction the majority luminance level of image matrix.

At step 1410, target image data is obtained based on the second color triangle and the target luminance level. The target image data includes a target luminance component and target chrominance components. In some embodiments, the target chrominance components include an x component and a y component. For example, the x, y values of the three vertices (e.g., A', B', and C') of the target color triangle 520 can be determined as the target chrominance components x and y for the three primary color channels in CIE-xyY color space respectively. For example, the x, y values of the left-top vertex A' of the target color triangle 520 is determined as the target chrominance components x, y of the green channel. The x, y values of the left-bottom vertex C' of the target color triangle 520 is determined as the target chrominance components x, y of the blue channel. The x, y values of the right vertex B' of the target color triangle 520 is determined as the target chrominance components x, y of the red channel. The target image data includes image data (i.e., x, y, Y) for each primary color channel.

With the compensation method provided by the present disclosure, not only the luminance nonuniformity is compensated, but also chrominance nonuniformity can be compensated. Therefore, the compensation performance is improved.

The embodiments may further be described using the following clauses:

1. A method for compensating a virtual image displayed by a near eye display based on a source image, comprising:
   acquiring virtual images displayed by the near eye display for three primary color channels, wherein each of the virtual images is based on a primary color test pattern;
   obtaining a correction factor matrix comprising luminance and chromaticity components of the three primary color channels; and
   performing compensation on the source image with the correction factor matrix.

2. The method according to clause 1, wherein obtaining the correction factor matrix comprising the luminance and chromaticity components of the three primary color channels further comprises:
   obtaining first image data of each of the primary color channels;
   determining target image data for each of the primary color channels based on the first image data; and
   obtaining the correction factor matrix based on the first image data and the target image data, wherein the first image data comprises a luminance component and chromaticity components, and the target image data comprise a target luminance component and target chromaticity components.

3. The method according to clause 2, wherein obtaining the first image data of each primary color channel comprises:
   obtaining a first luminance component and first chromaticity components of each of the primary color channels in a first color space; and
   converting the first luminance component and the first chromaticity components from the first color space to a second color space to obtain a second luminance component and second chromaticity components;
   wherein determining the target image data of each of the primary color channels based on the first image data further comprises:
      determining a first target luminance component and first target chromaticity components of each of the primary color channels in the second color space based on the second luminance component and the second chromaticity components; and
      converting the first target luminance component and the first target chromaticity components from the second color space to the first color space to obtain the target luminance component and the target chromaticity components; and wherein obtaining the correction factor matrix based on the first image data and the target image data further comprises:

obtaining the correction factor matrix based on the first luminance component, the first chromaticity components, the target luminance component, and the target chromaticity components.

4. The method according to clause 3, wherein the first color space is a CIE-XYZ color space and the second color space is a CIE-xyY color space.

5. The method according to any one of clauses 2 to 4, wherein obtaining the first image data of each of the primary color channels further comprises:

extracting grey values of the acquired virtual image for each primary color channel, respectively; and determining the luminance component and the chromaticity components from the grey value for the each of the primary color channels.

6. The method according to any one of clauses 1 to 5, wherein the three primary color channels comprise a green primary color channel, a blue primary color channel, and a red primary color channel.

7. The method according to any one of clauses 1 to 6, wherein after acquiring the virtual images, the method further comprises:

determining a region of interest (ROI) in each of the virtual images;

identifying pixels in the ROI of each of the virtual images; and extracting image data of each of the virtual images based on the identified pixels.

8. The method according to any one of clauses 1 to 7, wherein the correction factor matrix is a non-diagonal matrix.

9. The method according to clause 1, wherein obtaining the correction factor matrix comprising the luminance and chromaticity components of the three primary color channels further comprises:

obtaining an image data matrix for the three primary color channels based on the virtual images, and inverting the image data matrix to obtain an inverted image data matrix;

determining a target image data matrix for the three primary color channels; and obtaining a correction factor matrix by multiplying the inverted image data matrix and the target image data matrix.

10. The method according to clause 2, wherein determining the target image data for each of the primary color channels based on the first image data further comprises:

determining a first color triangle formed by first chromaticity components of the first image data of each of the primary color channels;

determining a second color triangle formed by target chromaticity components of the target image data of each of the primary color channels, wherein an area of the second color triangle is less than an area of the first color triangle; and determining values of the target chromaticity components for each of the primary color channels based on the second color triangle.

11. The method according to clause 10, wherein the second color triangle is within the first color triangle.

12. The method according to clause 10 or 11, wherein determining the values of the target chromaticity components for each of the primary color channels based on the second color triangle comprises:

determining the values of the target chromaticity components for each primary color channel based on coordinate values of vertexes of the second color triangle.

13. The method according to clause 7, wherein identifying the pixels in the ROI of each of the virtual images further comprises:

positioning the pixels in the ROI of each of the virtual images under a partial on-off pattern; and identifying the pixels.

14. A method for compensating a virtual image displayed by a near eye display based on a source image, comprising:

acquiring virtual images displayed by the near eye display for three primary color channels, wherein each of the virtual images is based on a primary color test pattern;

obtaining first chromaticity components for each of the primary color channels;

determining target chromaticity components for each of the primary color channels based on the first chromaticity components;

obtaining a correction factor matrix based on the target chromaticity components; and performing compensation on the source image based on the correction factor matrix.

15. The method according to clause 14, wherein determining the target chromaticity components for each of the primary color channels based on the first chromaticity components further comprises:

determining a first color triangle formed by the chromaticity components of each primary color channel;

determining a second color triangle formed by the target chromaticity components of each of the primary color channels, wherein an area of the second color triangle is less than an area of the first color triangle; and determining values of the target chromaticity components for each of the primary color channels based on the second color triangle.

16. The method according to clause 15, wherein the second color triangle is within the first color triangle.

17. The method according to clause 15 or 16, wherein determining the values of the target chromaticity components for each of the primary color channels based on the second color triangle comprises:

determining the values of the target chromaticity components for each of the primary color channels based on coordinate values of vertexes of the second color triangle.

18. The method according to clause 14, wherein obtaining the first chromaticity components for each of the primary color channels further comprises:

obtaining second chromaticity components for each of the primary color channels in a first color space; and converting the second chromaticity components from the first color space to a second color space to obtain the first chromaticity components;

wherein determining the target chromaticity components for each of the primary color channels based on the first chromaticity components further comprises:

determining the target chromaticity components for each of the primary color channels based on the first chromaticity components in the second color space; and wherein obtaining the correction factor matrix based on the target chromaticity components further comprises:

converting the target chromaticity components from the second color space to the first color space to obtain second target chromaticity components; and

obtaining the correction factor matrix based on the second target chromaticity components.

19. The method according to clause 18, wherein the first color space is a CIE-XYZ color space and the second color space is a CIE-xyY color space.

20. The method according to clause 14, wherein obtaining the correction factor matrix based on the target chromaticity components further comprises:

obtaining an image data matrix for the three primary color channels based on the virtual images, and inverting the image data matrix to obtain an inverted image data matrix, the data matrix comprising luminance components and chromaticity components for each of the primary color channels;

determining a target image data matrix for the three primary color channels; and obtaining a correction factor matrix by multiplying the inverted image data matrix and the target image data matrix, the target image data matrix comprising target luminance components and the target chromaticity components for each of the primary color channels.

21. The method according to any one of clauses 14 to 20, wherein the three primary color channels comprise a green primary color channel, a blue primary color channel, and a red primary color channel.

22. The method according to any one of clauses 14 to 21, wherein after acquiring the virtual images, the method further comprises:

determining a region of interest (ROI) in each of the virtual images;

identifying pixels in the ROI of each of the virtual images; and extracting image data of each of the virtual images based on the identified pixels.

23. The method according to clause 22, wherein identifying the pixels in the ROI of each of the virtual images further comprises:

positioning the pixels in the ROI of each of the virtual images under a partial on-off pattern; and identifying the pixels.

24. The method according to any one of clauses 14 to 23, wherein the correction factor matrix is a non-diagonal matrix.

25. A method for compensating a virtual image displayed by a near eye display based on a source image, comprising:

acquiring virtual images displayed by the near eye display for three primary color channels, wherein each of the virtual images is based on a primary color test pattern;

obtaining an image data matrix for the three primary color channels based on the virtual images, and inverting the image data matrix to obtain an inverted image data matrix;

determining a target image data matrix for the three primary color channels; and obtaining a correction factor matrix by multiplying the inverted image data matrix and the target image data matrix; and performing compensation on the source image based on the correction factor matrix.

26. The method according to clause 25, wherein the correction factor matrix comprises luminance and chromaticity components of the three primary color channels.

27. The method according to clause 26, wherein obtaining the image data matrix for the three primary color channels based on the virtual images comprises obtaining the image data matrix in a first color space; and

determining the target image data matrix for the three primary color channels further comprises:

converting the image data matrix from the first color space to a second color space to obtaining a second image data matrix;

determining a first target image data matrix in the second color space based on the second image data matrix; and converting the first target image data matrix from the second color space to the first color space to obtain the target image data matrix.

28. The method according to clause 27, wherein the first color space is a CIE-XYZ color space, and the second color space is a CIE-xyY color space.

29. The method according to any one of clauses 25 to 28, wherein obtaining the image data matrix for the three primary color channels further comprises:

extracting grey values of the acquired virtual image for each of the primary color channels, respectively; and determining a luminance component and chromaticity components from the grey value for each of the primary color channels.

30. The method according to any one of clauses 25 to 29, wherein the three primary color channels comprise a green primary color channel, a blue primary color channel, and a red primary color channel.

31. The method according to any one of clauses 25 to 30, wherein after acquiring the virtual images, the method further comprising:

determining a region of interest (ROI) in each of the virtual images;

identifying pixels in the ROI of each of the virtual images; and extracting image data of each of the virtual images based on the identified pixels.

32. The method according to clause 31, wherein identifying the pixels in the ROI of each of the virtual images further comprises:

positioning the pixels in the ROI of each of the virtual images under a partial on-off pattern; and identifying the pixels.

33. The method according to any one of clauses 25 to 32, wherein the correction factor matrix is a non-diagonal matrix.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for compensating a virtual image displayed by a near eye display based on a source image, comprising:
    acquiring virtual images displayed by the near eye display for three primary color channels, wherein each of the virtual images is based on a primary color test pattern;
    obtaining an image data matrix for the three primary color channels based on the virtual images, and inverting the image data matrix to obtain an inverted image data matrix;
    determining a target image data matrix for the three primary color channels;
    obtaining a correction factor matrix by multiplying the inverted image data matrix and the target image data matrix; and
    performing compensation on the source image based on the correction factor matrix;

wherein obtaining the image data matrix for the three primary color channels based on the virtual images comprises obtaining the image data matrix in a first color space; and
    determining the target image data matrix for the three primary color channels further comprises:
        converting the image data matrix from the first color space to a second color space to obtaining a second image data matrix;
        determining a first target image data matrix in the second color space based on the second image data matrix; and
        converting the first target image data matrix from the second color space to the first color space to obtain the target image data matrix.

2. The method according to claim 1, wherein the correction factor matrix comprises luminance and chromaticity components of the three primary color channels.

3. The method according to claim 1, wherein the first color space is a CIE-XYZ color space, and the second color space is a CIE-xyY color space.

4. The method according to claim 1, wherein obtaining the image data matrix for the three primary color channels further comprises:
    extracting grey values of the acquired virtual image for each of the primary color channels, respectively; and
    determining a luminance component and chromaticity components from the grey value for each of the primary color channels.

5. The method according to claim 1, wherein the three primary color channels comprise a green primary color channel, a blue primary color channel, and a red primary color channel.

6. The method according to claim 1, wherein after acquiring the virtual images, the method further comprising:
    determining a region of interest (ROI) in each of the virtual images;
    identifying pixels in the ROI of each of the virtual images; and
    extracting image data of each of the virtual images based on the identified pixels.

7. The method according to claim 6, wherein identifying the pixels in the ROI of each of the virtual images further comprises:
    positioning the pixels in the ROI of each of the virtual images under a partial on-off pattern; and
    identifying the pixels.

8. The method according to claim 1, wherein the correction factor matrix is a non-diagonal matrix.

9. A method for compensating a virtual image displayed by a near eye display based on a source image, comprising:
    acquiring virtual images displayed by the near eye display for three primary color channels, wherein each of the virtual images is based on a primary color test pattern;
    obtaining a correction factor matrix comprising luminance and chromaticity components of the three primary color channels; and
    performing compensation on the source image with the correction factor matrix;
    wherein obtaining the correction factor matrix comprising the luminance and chromaticity components of the three primary color channels further comprises:
        obtaining first image data of each of the primary color channels;
        determining target image data for each of the primary color channels based on the first image data; and obtaining the correction factor matrix based on the first image data and the target image data, wherein the first image data comprises a luminance component and chromaticity components, and the target image data comprise a target luminance component and target chromaticity components.

10. The method according to claim 9, wherein obtaining the first image data of each primary color channel comprises:

obtaining a first luminance component and first chromaticity components of each of the primary color channels in a first color space; and converting the first luminance component and the first chromaticity components from the first color space to a second color space to obtain a second luminance component and second chromaticity components;

wherein determining the target image data of each of the primary color channels based on the first image data further comprises:

determining a first target luminance component and first target chromaticity components of each of the primary color channels in the second color space based on the second luminance component and the second chromaticity components; and converting the first target luminance component and the first target chromaticity components from the second color space to the first color space to obtain the target luminance component and the target chromaticity components; and wherein obtaining the correction factor matrix based on the first image data and the target image data further comprises:

obtaining the correction factor matrix based on the first luminance component, the first chromaticity components, the target luminance component, and, the target chromaticity components.

11. The method according to claim 10, wherein the first color space is a CIE-XYZ color space and the second color space is a CIE-xyY color space.

12. The method according to claim 9, wherein obtaining the first image data of each of the primary color channels further comprises:

extracting grey values of the acquired virtual image for each primary color channel, respectively; and determining the luminance component and the chromaticity components from the grey value for the each of the primary color channels.

13. The method according to claim 9, wherein the three primary color channels comprise a green primary color channel, a blue primary color channel, and a red primary color channel.

14. The method according to claim 9, wherein after acquiring the virtual images, the method further comprises:

determining a region of interest (ROI) in each of the virtual images;

identifying pixels in the ROI of each of the virtual images; and extracting image data of each of the virtual images based on the identified pixels.

15. The method according to claim 14, wherein identifying the pixels in the ROI of each of the virtual images further comprises:

positioning the pixels in the ROI of each of the virtual images under a partial on-off pattern; and identifying the pixels.

16. The method according to claim 9, wherein the correction factor matrix is a non-diagonal matrix.

17. The method according to claim 9, wherein determining the target image data for each of the primary color channels based on the first image data further comprises:

determining a first color triangle formed by first chromaticity components of the first image data of each of the primary color channels;

determining a second color triangle formed by target chromaticity components of the target image data of each of the primary color channels, wherein an area of the second color triangle is less than an area of the first color triangle; and determining values of the target chromaticity components for each of the primary color channels based on the second color triangle.

18. The method according to claim 17, wherein the second color triangle is within the first color triangle.

19. The method according to claim 17, wherein determining the values of the target chromaticity components for each of the primary color channels based on the second color triangle comprises:

determining the values of the target chromaticity components for each primary color channel based on coordinate values of vertexes of the second color triangle.

* * * * *